US012649242B2

(12) United States Patent　　(10) Patent No.:　US 12,649,242 B2

Dettorre et al.　　(45) **Date of Patent:　*Jun. 9, 2026**

(54) SYSTEM AND PROCESS FOR PICKING TIRES IN AN UNKNOWN ARRANGEMENT

(71) Applicant: COMPAGNIE GENERALE DES ETABLISSEMENTS MICHELIN, Clermont-Ferrand (FR)

(72) Inventors: Jean-Marie Dettorre, Clermont-Ferrand (FR); Nicolas Bard, Clermont-Ferrand (FR); Quentin Deniau, Clermont-Ferrand (FR); Michel Druet, Clermont-Ferrand (FR); Mohamed-Abbas Konate, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 173 days.

This patent is subject to a terminal disclaimer.

(21) Appl. No.: 18/268,781

(22) PCT Filed: Dec. 10, 2021

(86) PCT No.: PCT/EP2021/085134

§ 371 (c)(1),
(2) Date: Jun. 21, 2023

(87) PCT Pub. No.: WO2022/135968

PCT Pub. Date: Jun. 30, 2022

(65) Prior Publication Data

US 2024/0075626 A1　　Mar. 7, 2024

(30) Foreign Application Priority Data

Dec. 23, 2020　(FR) ...................................... 2014099

(51) Int. Cl.
　*B25J 9/16*　　　(2006.01)
　*B25J 15/10*　　(2006.01)
　(Continued)

(52) U.S. Cl.
　CPC ........... *B25J 9/1697* (2013.01); *B25J 9/1612* (2013.01); *B25J 15/10* (2013.01); *B65B 5/105* (2013.01);
　(Continued)

(58) Field of Classification Search
　CPC ...... B25J 9/1612; B25J 9/1669; B25J 9/1697; B25J 13/08; B25J 9/1687; B25J 15/0047;
　(Continued)

(56) References Cited

U.S. PATENT DOCUMENTS 8,244,400 B2　8/2012　Cottone et al.
8,538,579 B2　9/2013　Cottone et al.
(Continued)

FOREIGN PATENT DOCUMENTS

CN　　109205332　A　　1/2019
CN　　211344699　U　　8/2020
(Continued)

OTHER PUBLICATIONS

"Unsupervised Learning", https://fr.mathworks.com/discovery/unsupervised-learning.html (retrieved Nov. 4, 24).
(Continued)

*Primary Examiner* — Khoi H Tran
*Assistant Examiner* — Tanner L Cullen
(74) *Attorney, Agent, or Firm* — VENABLE LLP

(57)　　　ABSTRACT

A tire picking system (100) performs a process for picking one or more tires stored in an unknown arrangement and for which a target location must be realized. A gripper (108) and a robot (102) including a gripping device (104) supported by a pivotable elongated arm (106), the gripping device extend- (Continued)

ing from the elongated arm to a free end (104*a*) where the gripper is disposed, form part of the system (100). An image processing module applies data representative of the physical environment around the robot (102) to a deployed neural network in order to determine one or more parameters of a target tire (P*); the robot is set in motion based on the determined parameters of the target tire, so that the gripper can pick a target tire (P*) selected by the system (100) from among the stored tires.

9 Claims, 6 Drawing Sheets

(51) Int. Cl.
| | |
|---|---|
| *B65B 5/10* | (2006.01) |
| *B65B 25/24* | (2006.01) |
| *G06V 10/82* | (2022.01) |
| *G06V 20/50* | (2022.01) |

(52) U.S. Cl.
CPC .............. *B65B 25/24* (2013.01); *G06V 10/82* (2022.01); *G06V 20/50* (2022.01); *G05B 2219/40053* (2013.01)

(58) Field of Classification Search
CPC ...... B25J 15/0253; B25J 15/10; B25J 15/103; B25J 15/106; B25J 15/12; B25J 15/08; B25J 15/083; B25J 15/086; G05B 2219/40053; G05B 2219/45063; G05B 2219/40528; G05B 2219/40532; G05B 2219/39484; G05B 2219/39473; B65B 25/24; B65B 5/105; B60C 25/0515; B60C 25/132
See application file for complete search history.

(56) References Cited

U.S. PATENT DOCUMENTS

| | | |
|---|---|---|
| 9,440,349 B2 | 9/2016 | Criswell |
| 2010/0163189 A1 | 7/2010 | Lawson et al. |
| 2010/0272547 A1 | 10/2010 | Cottone et al. |
| 2011/0132491 A1 | 6/2011 | Donnay et al. |
| 2012/0267055 A1* | 10/2012 | Rogalla .................... B25J 15/10 |
| | | 29/894.31 |
| 2016/0159586 A1 | 6/2016 | Clark et al. |
| 2018/0215212 A1* | 8/2018 | Kerwin .............. B60C 25/0515 |
| 2019/0126471 A1* | 5/2019 | Kobayashi ............... B25J 9/163 |
| 2022/0152834 A1* | 5/2022 | Kupcsik ................ B25J 9/1697 |
| 2023/0281976 A1 | 9/2023 | Chateau et al. |
| 2024/0051770 A1 | 2/2024 | Dettorre et al. |
| 2025/0042037 A1 | 2/2025 | Konate |

FOREIGN PATENT DOCUMENTS

| | | | |
|---|---|---|---|
| DE | 2426471 A1 | 12/1975 | |
| DE | 10 2019 102 212 A1 | 7/2020 | |
| GB | 1457473 | 12/1976 | |
| JP | 4-323114 A | 11/1992 | |
| KR | 10-2006-0018963 A | 3/2006 | |
| WO | 2008/063212 A2 | 5/2008 | |
| WO | WO-2020156751 A1 * | 8/2020 | .......... B25J 15/0047 |

OTHER PUBLICATIONS

Copending U.S. Appl. No. 18/717,241, filed Dec. 6, 2022.
International Search Report dated Mar. 29, 2022, in corresponding PCT/EP2021/085134 (5 pages).
V. Mnih, et al., "Asynchronous Methods for Deep Reinforcement Learning", Proc. of the 33rd Int'l Conf. on Machine Learning, New York, NY, 19 pages (2016).

* cited by examiner

SYSTEM AND PROCESS FOR PICKING TIRES IN AN UNKNOWN ARRANGEMENT

TECHNICAL FIELD

The invention relates to a system for picking and arranging tires stored in a container as stacks, arranged horizontally as rolls or nested together. The invention also relates to a process for picking one or more stored tires without knowledge of the arrangement of the stored tires.

BACKGROUND

In the field of tire extraction, there are tire arrangements that facilitate their handling and that ensure optimal storage in the available storage space. Referring to FIG. 1, an embodiment of tire storage is represented in which several layers of tires 10 partially overlap one another. In this type of tire storage (known in the art as a "rick-rack" arrangement), the tires are stacked in a container 12, with the direction of overlapping being reversed from one layer to the next. In this configuration, the space between lateral parts 12a of the container 12 is optimized in an optimal manner. The container 12 may be selected from containers for transporting tires, including, without limitation, pallets, truck dumpers, chain-linked trucks, van bodies and their equivalents. The structure of this stacking pattern is described in detail in the patent DE2426471A1.

Other types of tire storage are also known for transporting such tires in containers. In one embodiment of tire storage known as "storage in rolls", the tires are stored next to one another on their tread along a common horizontal axis. In one embodiment of tire storage known as "storage in stacks", the tires are stacked next to one another on their sidewalls along a common vertical axis.

There are automated solutions for stacking the tires in containers according to the selected type of storage. These solutions incorporate the steering of a robot by vision within the framework of the seizure of tires by gripping. Examples are provided by U.S. Pat. No. 8,244,400 (which discloses an automated tire stacking device on a support that includes a handling device with one or more gripper tools that are coupled for receiving and disposing the tires), U.S. Pat. No. 8,538,579 (which discloses a depalletization system for implementing a process for de-palletizing tires disposed on a support, the system being guided by a robot with a gripping tool), and U.S. Pat. No. 9,440,349 (which discloses an automatic loader/unloader of tires for stacking them into/unstacking them from a trailer, including an industrial robot capable of a selective articulated movement of an end effector between a motorized transport path and an accessible space so that it can be used for placing the tires in the accessible space).

Picking technologies use a combination of laser scanning of the surface assumed to contain the objects to be picked and knowledge of the object being sought (CAD). The system seeks to superimpose the elements measured in real space with the known elements of the CAD in order to find the object and its spatial configuration precisely and then be able to pick it up in a manner that is consistent with the gripper design. Thus, the majority of the methods used in the industry work by trying to control the environment. From a hardware standpoint, this can be done by demanding facilities that are highly specialized for that task, either by learning references in the fixed working environment, or else by trying to realign a CAD model in a point cloud type scene in order to detect an object. In all of these instances, there is no way of managing a situation that is unexpected within its environment.

A method requiring a specific hardware setup, however sophisticated it might be, will no longer work if there are significant variations in the setup. Model matching requires that all objects in the container be identical (within one scale factor) and largely visible to have a proper match. For example, U.S. Pat. No. 8,538,579 proposes using the CAD data of tires to perform the "storage densification" work. This requires either a completely homogeneous pallet of identical tires that are sized once and then automatically processed by the system, or a case-by-case reading of the tire part number, calling up its dimensions in a CAD database, calculating the optimal storage position, and then handling the tire.

In addition to these solutions, there are controls (for example, labels, barcodes and their equivalents) that require a certain rigor in the stacking, which further slows down the human work and makes the automation of tasks more complex.

The limits are therefore of several types: the scanning time, the need to see the object sufficiently to detect it and knowledge of the CAD data for the object. The complexity is further increased when dealing with heterogeneous bulk. Emptying a bulk-loaded truck is a task that by definition is unpredictable: the order of the nested tires is not known in advance, nor their dimensions; accessibility is reduced, as is accessibility for gripping; and the tires can be seen only from the front. Controlling the environment is therefore not a viable situation. It is possible to add unsupervised learning capabilities by using a mechanical system and software able that can adapt in real or almost real-time (that is, within industrially acceptable timeframes) to any set of nested tires.

Automatic unsupervised learning (or "unsupervised learning") algorithms are used to group unstructured data together into clusters based on similarities. The term "unsupervised" refers to the fact that the algorithm operates by finding structures hidden in unlabelled data using partitioning or clustering techniques (for example the common clustering algorithms that include, without limitation, hierarchical clustering, k-means clustering, Gaussian mixture models, self-organizing maps (using neural networks that learn the topology and distribution of the data), and hidden Markov models (see "Unsupervised Learning", https://fr.mathworks.com/discovery/unsupervised-learning.html). In image processing and computer viewing, unsupervised shape recognition techniques are used to detect objects and partition images. Unsupervised machine learning therefore allows all kinds of unknown models to be found in the data. As used herein, the term "unsupervised learning" also includes semi-supervised learning.

Thus, the disclosed invention is directed to a system that is differentiated by the position of the contact points. This criterion is justified by the unknown type of storage of tires in a truck, thus requiring stability of all types of tires, including wide tires with low sidewalls or very large tires with tall sidewalls that are not very rigid. The system of the invention incorporates a combination of vision techniques and unsupervised learning to reconstruct the observed scene correctly and quickly from three-dimensional (or 3D) scattered point clouds, derived from a parcellated front view of the target tires. This combination facilitates a storage optimization function aimed at enhancing the gripping of tires and, in particular, of random arrangements of tires.

SUMMARY OF THE INVENTION

The invention is directed to a tire picking system that performs a process for picking one or more tires stored in an unknown manner and for which a target location must be realized, the system including:

a robot with a gripping device supported by a pivotable elongated arm, the gripping device extending from the elongated arm to a free end;

a gripper disposed along a longitudinal axis at the free end of the gripping device;

a detection system that employs one or more sensors to capture one or more images of the physical environment around the robot incorporating the stored tires and to collect representative data within the field of view of the sensors; and a processor having an image processing module that applies the representative data to a deployed neural network and analyzes the captured images in order to determine, using the deployed neural network, one or more parameters of a target tire imaged in the field of view of the sensors;

such that the robot is set in motion based on the determined parameters of the target tire, so that the gripper can perform picking of a target tire selected by the system from among the arranged tires along an inner sidewall boundary of the selected target tire.

In certain embodiments of the system, the gripper includes:

a platform with a predetermined length between an attachment end, at which the platform is removably attached to the robot, and an opposite free end, the platform including:

a substantially planar outer face with an exterior side that protects the platform and an opposite interior side; and a substantially planar inner face with an exterior side and an opposite interior side, the internal face incorporating a path from the free end to a stop of the platform;

with each outer face and each inner face having a predetermined width and a predetermined length that extends between the attachment end and the free end of the platform, and the two faces being separated by a predetermined distance between the interior side of the outer face and the interior side of the inner face; and an internal finger and an external finger housed in the platform, each of the internal finger and the external finger including a pivotable and retractable member of predetermined length that extends between an actuation end and an opposite engagement end;

with each finger being movable along the path of the inner face of the platform between a standby position, in which the finger bends into a position substantially parallel to the plane of the inner face, and a gripping position, in which the finger unfolds into an angular position with respect to the plane of the inner face so that it is ready to engage the target tire along the inner sidewall boundary of the selected target tire.

In certain embodiments of the system, the parameters of the imaged target tire include at least one parameter among the following parameters:

the inner boundary and an outer boundary of the sidewall that together define the boundaries of the sidewall of the target tire;

a rim radius defined as being the distance between a central point of the tire and the inner sidewall boundary;

an inner sidewall diameter defined as being twice the rim radius;

a tire radius defined as being the distance between the central point and the outer sidewall boundary; and a tire diameter defined as being twice the tire radius.

In certain embodiments of the system, the gripper is configured so that the engagement end of the internal finger engages a first engagement point along the inner sidewall boundary of the target tire, and the engagement end of the external finger engages a second engagement point along the inner sidewall boundary of the target tire, such that the gripper engages the target tire along the inner sidewall diameter of the target tire.

In certain embodiments of the system, the system further includes a control system that directs the movement of the robot based on the data representative of the physical environment obtained by the detection system.

The invention is also directed to a gripper forming part of a tire picking system that performs a process of picking one or more tires stored in an unknown arrangement and for which a target location must be realized, the gripper including:

a platform with a predetermined length between an attachment end, at which the platform is detachably attached to the robot, and an opposite free end, the platform including:

a substantially planar outer face with an exterior side that protects the platform and an opposite interior side; and a substantially planar inner face with an exterior side and an opposite interior side, the inner face incorporating a path from the free end to a stop of the platform;

with each outer face and each inner face having a predetermined width and a predetermined length that extends between the attachment end and the free end of the platform, and the two faces being separated by a predetermined distance between the interior side of the outer face and the interior side of the inner face; and an internal finger and an external finger housed in the platform, each of the internal finger and the external finger including a pivotable and retractable member of predetermined length that extends between an actuation end and an opposite engagement end;

with each finger being movable along the path of the inner face of the platform between a standby position, in which the finger is folded into a position substantially parallel to the plane of the inner face, and a gripping position, in which the finger is unfolded into an angular position with respect to the plane of the inner face so that it is ready to engage a target tire selected from the arranged tires along an inner sidewall boundary of the selected target tire corresponding to an inner sidewall diameter of the target tire.

In certain embodiments of the gripper, the gripper is configured so that the engagement end of the internal finger engages a first engagement point along the inner sidewall boundary of the target tire, and the engagement end of the external finger engages a second engagement point along the inner sidewall boundary of the target tire so that the gripper engages the target tire along the inner sidewall diameter of the target tire.

In certain embodiments of the gripper, a processor of the system includes a module for processing the images of the physical environment around the gripper that applies data representative of the physical environment to a deployed neural network and analyzes the captured images to determine, using the deployed neural network, one or more parameters of the target tire such that the gripper can pick the target tire based on the determined parameters.

In certain embodiments of the gripper, the determined parameters include at least one of the following parameters:

the inner boundary and an outer boundary of the sidewall that together define the boundaries of the sidewall of the target tire;

a rim radius defined as being the distance between a central point of the tire and the inner sidewall boundary;

an inner sidewall diameter defined as being twice the rim radius;

a tire radius defined as being the distance between the central point and the outer sidewall boundary; and a tire diameter defined as being twice the tire radius.

The invention is further directed to a robot having a gripping device supported by a pivotable elongated arm, the gripping device extending from the elongated arm to a free end where a gripper of the invention is disposed.

Other aspects of the invention will become apparent from the following detailed description.

BRIEF DESCRIPTION OF THE DRAWINGS

The nature and various advantages of the invention will become more apparent from reading the following detailed description, in conjunction with the attached drawings, in which the same reference numerals denote identical parts throughout, and in which.

DETAILED DESCRIPTION

Figure 1:
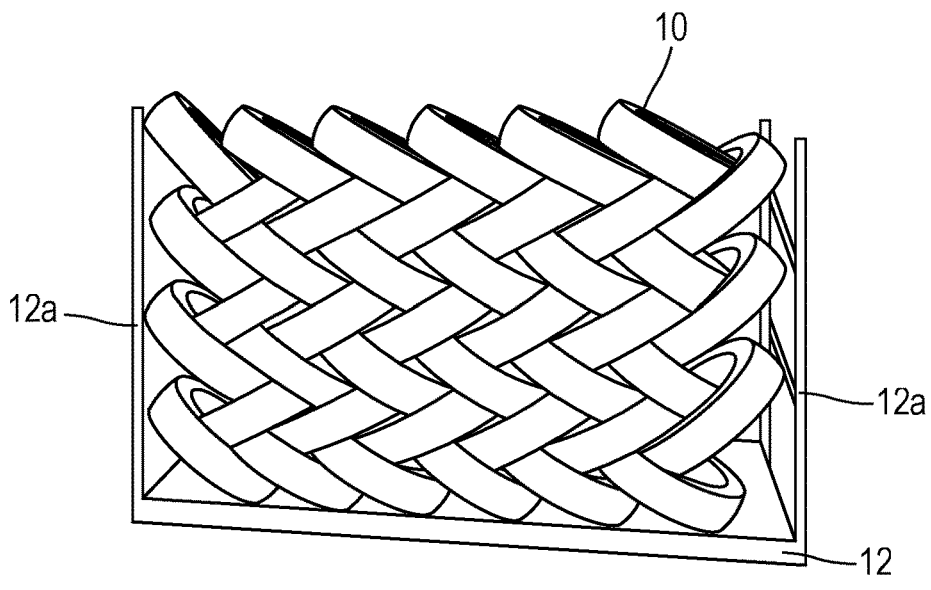
FIG. 1 represents a perspective view of a tire storage embodiment.
Figure 2:
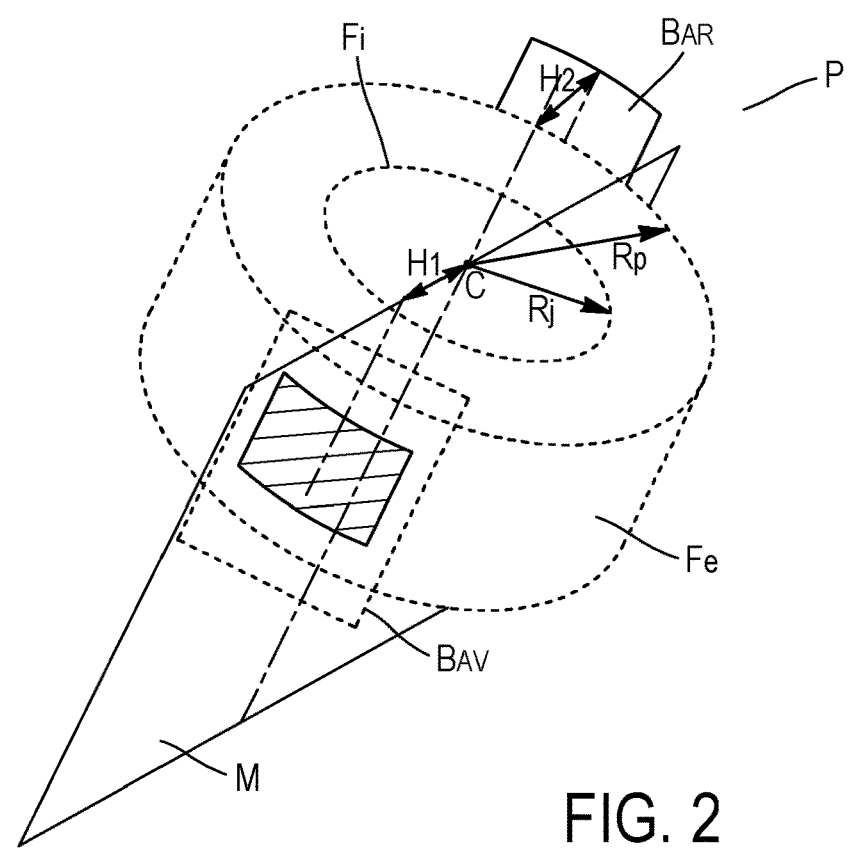
FIGS. 2 and 3 represent constituent components of a known tire in a meridian plane.
Figure 3:
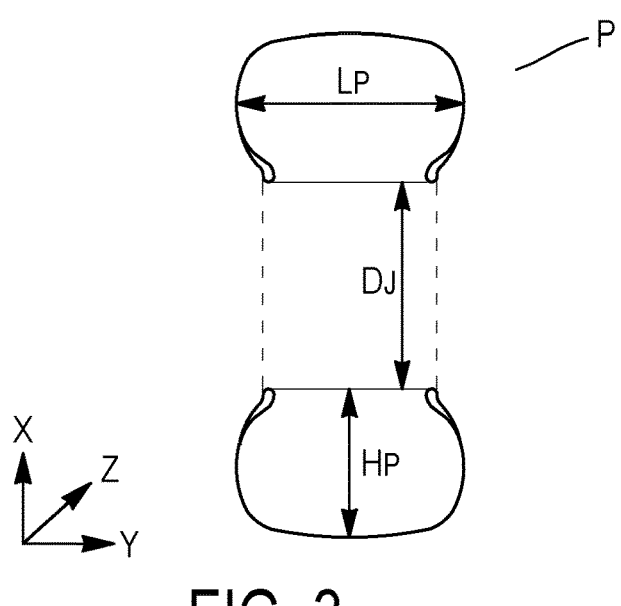

In considering the type of tire storage that best utilizes the available storage space, it is necessary to consider the geometry of the tires that are being transported. FIGS. 2 and 3 represent schematics of a tire P that includes, in a conventional manner, two circumferential beads intended to anchor the tire on a rim. Each bead includes an annular reinforcing bead wire. The makeup of a tire is typically described by a representation of its constituent components in a meridian plane, that is to say a plane containing the axis of rotation of the tire. The radial, axial and circumferential directions respectively denote the directions perpendicular to the axis of rotation of the tire, parallel to the axis of rotation of the tire, and perpendicular to any meridian plane. The expressions "radially", "axially" and "circumferentially" respectively mean "in a radial direction", "in the axial direction" and "in a circumferential direction" of the tire. The expressions "radially interior" and "respectively radially exterior" mean "closer to, respectively further away from, the axis of rotation of the tire, in a radial direction".

Referring to FIG. 2, the tire P has an inner boundary $F_I$ and an outer boundary $F_E$ that together define the boundaries of a sidewall F of the tire P. The inner boundary $F_I$ separates the sidewall F of the tire from a rim (not depicted) on which the tire is intended to be mounted. The tire P also has a rim radius $R_I$ defined as being the distance between a central point C of the tire and the inner boundary $F_I$ that separates the rim and the sidewall F of the tire. The tire P also has a sidewall internal diameter defined as being twice the rim radius $R_I$. The tire P also has a tire radius $R_P$ defined as being the distance between the central point C and an outer boundary $F_E$ of the sidewall F that represents the tread surface of the tire. The tire P also has a tire diameter defined as being twice the tire radius $R_P$.

Referring to FIG. 3, the inflated and unloaded tire P includes several parameters pertaining to its geometry, including a nominal section width $L_P$ and a height $H_P$ (the height $H_P$ often being expressed as a percentage of the width $L_P$). The tire P also includes a measurement $D_J$ that represents the diameter of a rim on which the tire is intended to be mounted (this measurement being substantially equal to the diameter of the inner sidewall boundary $F_I$). It is understood that each of these parameters may be expressed in equivalent known length measurements (for example, in millimetres (mm) or in inches (in)).

Figure 4:
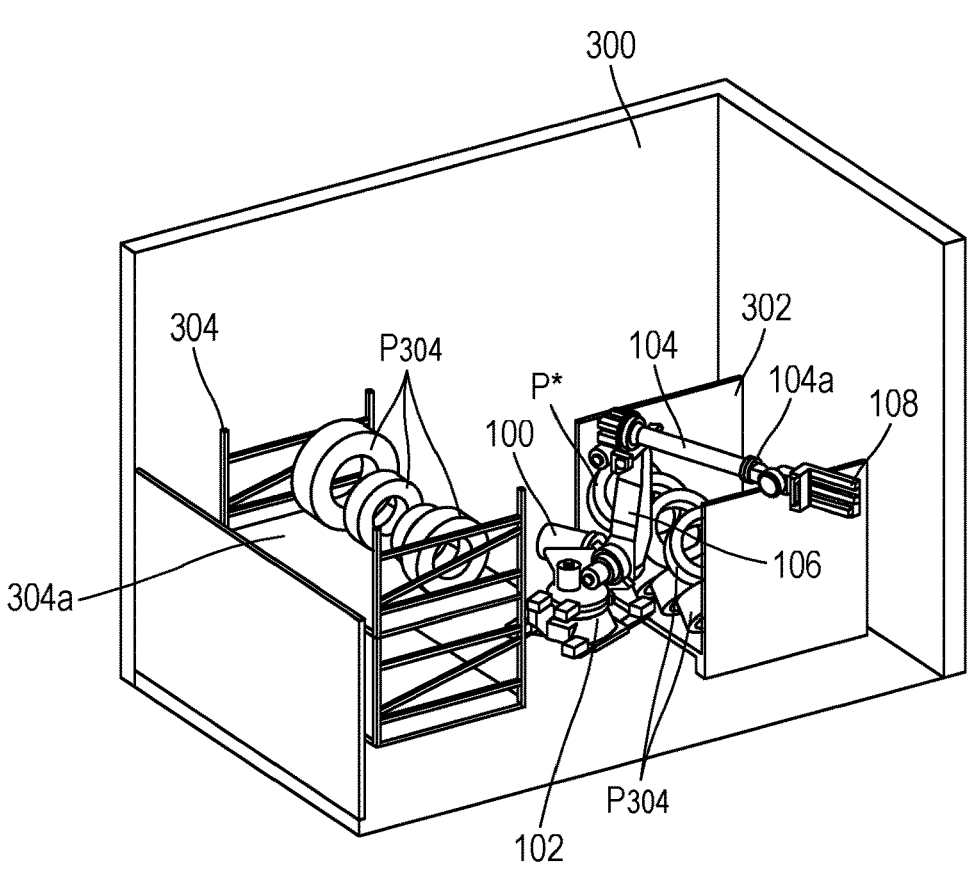
FIG. 4 represents a schematic view of an embodiment of a system of the invention during the performance of a picking process

Referring now to FIGS. 4 to 7, in which the same numerals identify identical elements, FIG. 4 depicts a tire picking system (or "system") 100 of the invention. It is understood that the term "picking" includes the functions of storage and removal from storage of tires arranged in (or "picked from") a truck, a container or some other dedicated space, and the target arrangement of the tires. The system 100 performs a picking process that incorporates a method of recalculating the shape of a target tire that is based on minimal surface information. At the drop-off site, the algorithm employed analyzes the surface of the target tire and determines the ideal zone to stably place the picked tire. The system 100 therefore continuously improves the selection of tires to be picked.

The term "target tire" (in the singular or the plural) is used herein to refer to a tire that is present in the physical environment of the system 100 and that is identified for picking during a picking process of the invention performed by the system 100.

The system 100 can be used in spaces where tires are arranged in an unknown manner and where their target arrangement must be realized. As depicted in FIG. 4, the system 100 is used, by way of example, in an enclosure 300 where a container 302 is disposed with tires $P_{302}$ arranged therein. The enclosure 300 also includes a rack 304 upon which the system 100 arranges the tires $P_{302}$ coming from the container 302 (or, working in reverse, the system 100 may take the tires $P_{304}$ arranged on the rack 304 to store them in the container 302). The system 100 creates a target arrangement of the tires either in the rack 304 or in the container 302. It is understood that the system 100 may operate in several physical environments without prior knowledge of the parameters of such environments (for example, an initial or target arrangement of the tires in a truck, in a depot, on a pallet or with respect to other known storage and/or transport means).

The term "target location" (in the singular or the plural) is used herein to refer to a dedicated space where the target tires picked by the system 100 will be arranged. By way of example, as depicted in FIG. 4, the rack 304 and the container 302 represent target locations in which to create a target arrangement of the tires. The term "target arrangement" (in the singular or the plural) refers to a desired arrangement for the tires arranged in a target location (for example, in a "rick-rack" manner, in "rolls", or in "stacks").

Figure 5:
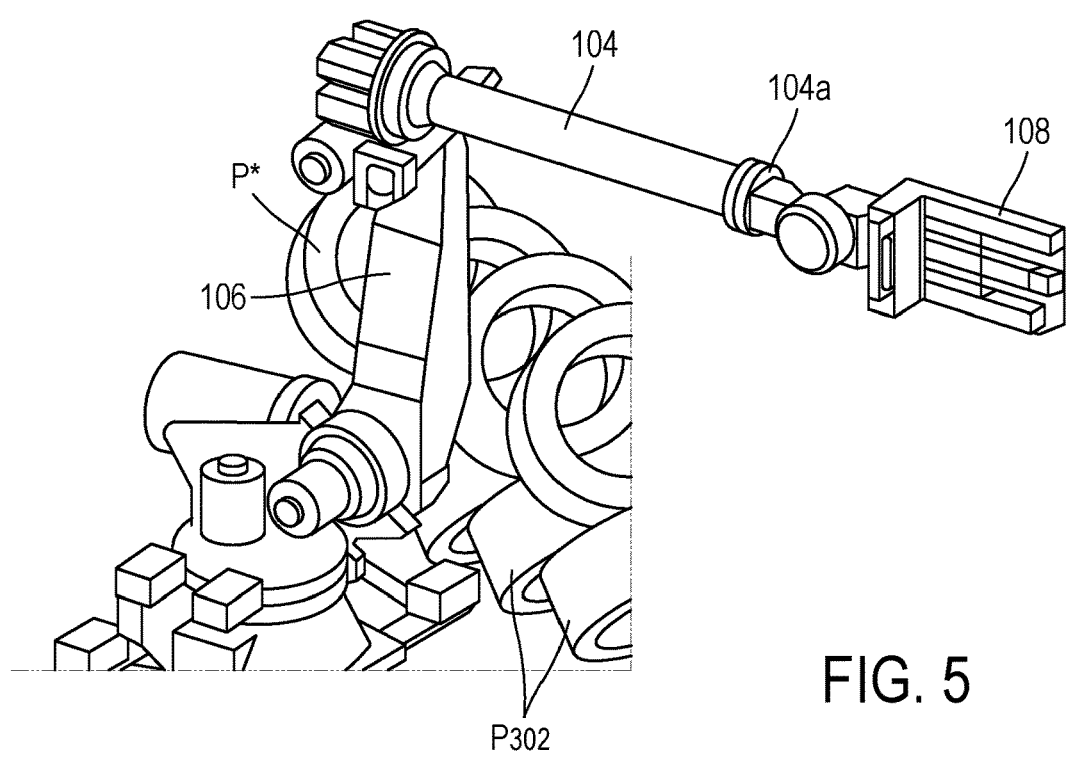
FIG. 5 represents a partial perspective view of an embodiment of a robot of the system of FIG. 4 incorporating a gripper.
Figure 6:
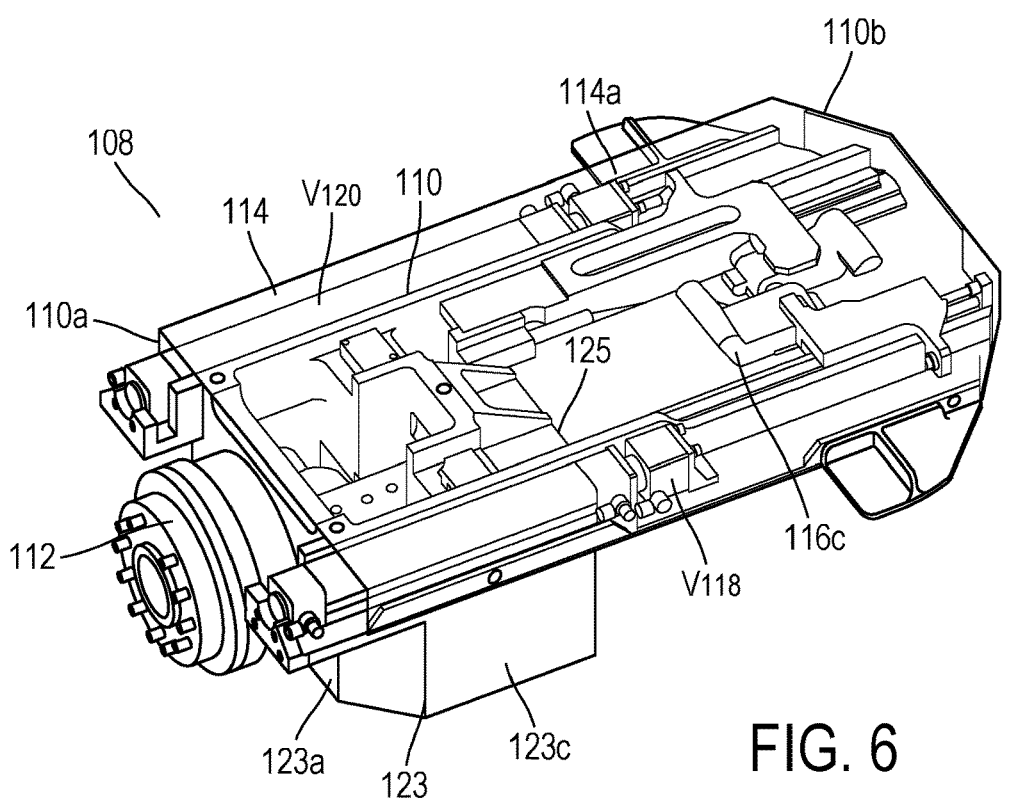
FIG. 6 represents a perspective view from above.
Figure 7:
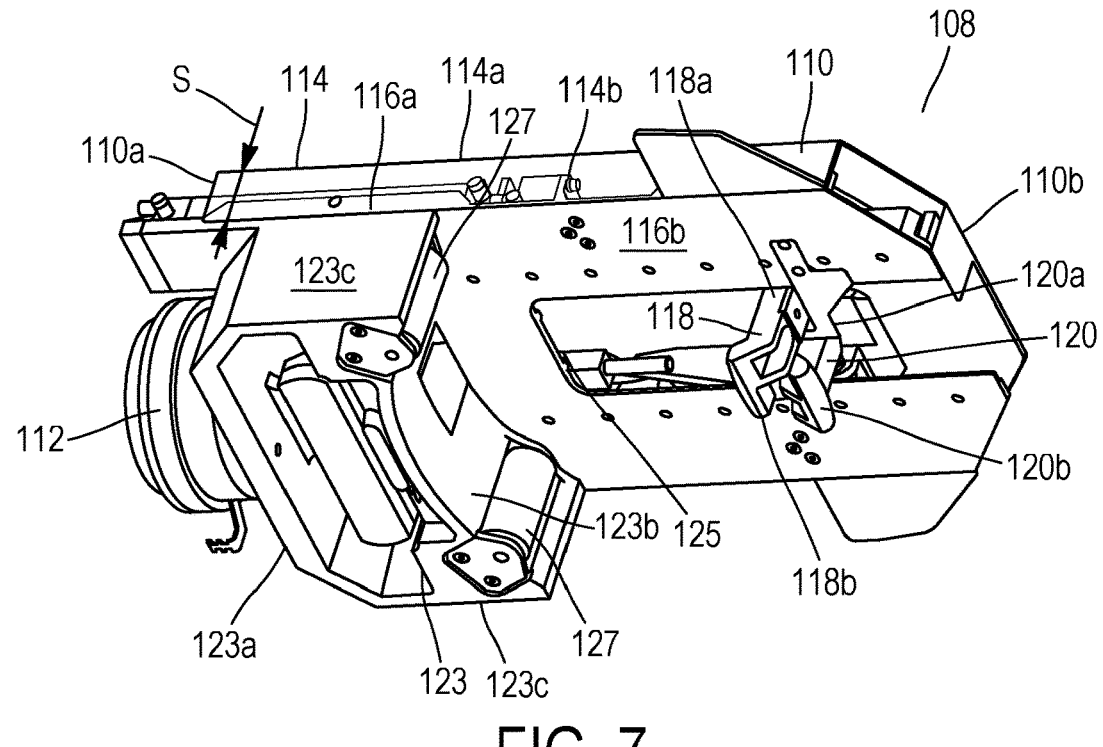
FIG. 7 represents a perspective view from below, of an embodiment of the gripper of FIG. 5.
Figure 8:
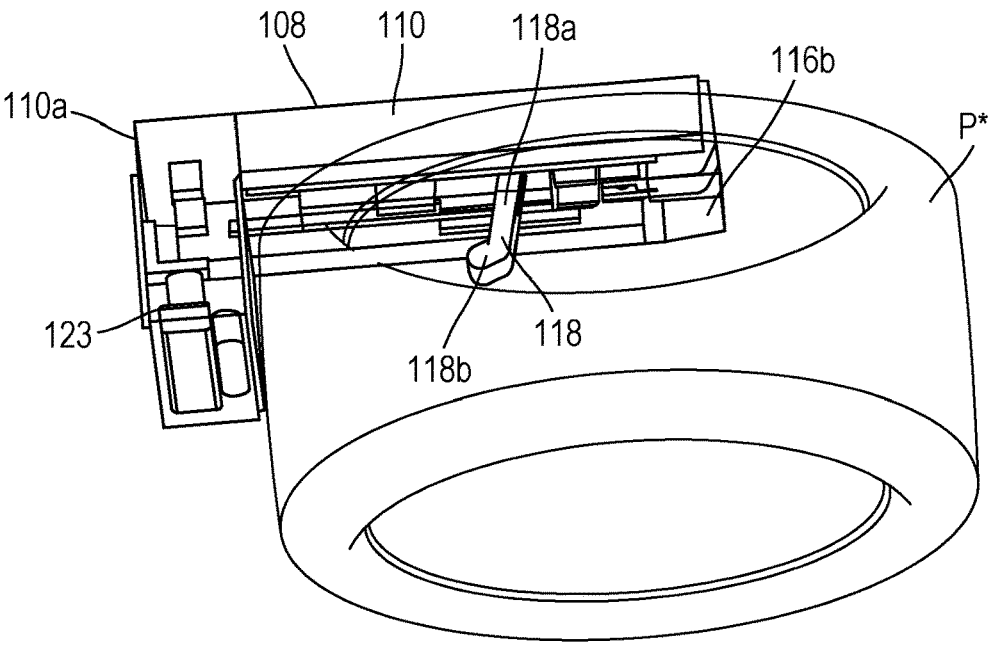
FIG. 8 represents a schematic view from above.

With reference again to FIG. 4 and also to FIGS. 5 to 7, the system 100 includes an itinerant robot (or "robot") 102 having a gripping device 104 supported by a pivotable elongated arm 106. The gripping device 104 extends from the elongated arm 106 to a free end 104*a* where a gripper 108 is arranged along a longitudinal axis e-e (see FIG. 5). The robot 102 is set in motion such that the gripper 108 can pick a tire targeted by the system 100 during a picking process performed by the system (as described hereinbelow and as depicted with reference to FIGS. 8 to 12). By "itinerant", it is understood that the robot 102 can be set in motion either by integrated movement means (for example, one or more integrated motors) or by non-integrated movement means (for example, one or more autonomous mobile carriages or other equivalent mobility means). It is understood that the robot 102 may be attached to a ceiling, to a wall or to any support that allows the system 100 to perform the picking process of the invention. It is understood that the robot 102 may be a conventional industrial robot or a collaborative robot or even a Delta robot or wired robot.

The robot 102 includes a detection system that employs one or more sensors (not depicted) that capture information regarding the physical environment around the robot 102. In the following description, the terms "sensor", "photographic equipment", "camera" and "optical sensor" may be used interchangeably and may refer to one or more items of equipment configured to detect two-dimensional (2-D) and/or three-dimensional (3-D) images, to achieve 3-D depth perception and/or other types of detection of the physical environment. The sensors of the detection system incorporated with the robot 102 may be fixed to at least one of the elongated arm 106 and the gripper 108 of the robot.

The sensor or sensors of the detection system of the system 100 detect the presence of an arrangement of tires in the field of view of the camera, and this triggers the camera to capture the image of a target tire. In certain embodiments of the system 100, the sensor triggers when a sidewall of a target tire enters the field of view of the camera against the background of the captured image. In instances where a portion of the target tire is not visible in the image obtained by the camera, an arbitrary point may be positioned at a known position with respect to the sensor of the detection system (for example, at a known horizontal distance and at a known vertical distance from the position of the sensor).

The detection system may determine the information pertaining to the physical environment that may be used by a control system (which includes, for example, software for directing the movements of the robot 102). The control system may reside on the robot 102 or it may be in remote communication with the robot. In some embodiments of the system 100, one or more 2-D or 3-D sensors mounted on the robot 102 (including, without limitation, navigation sensors) may be integrated to form a digital model of the physical environment (including, where applicable, the side(s), the floor and the ceiling). Using the resulting data, the control system can provoke movement of the robot 102 in order to navigate between the positions for picking the target tires.

Referring to FIGS. 5 to 7, an embodiment of the gripper 108 includes a platform 110 with a predetermined length between an attachment end 110*a* and an opposite free end 110*b*. The attachment end 110*a* may include an adapter 112 that allows for removable attachment of the platform 110 to the robot 102. Attachment of the platform 110 to the robot 102 may be accomplished by screwing the adapter 112 to the free end 104*a* of the gripping device 104. It is understood that the attachment of the platform 110 to the robot 102 may be effected by any known attachment means (including, without limitation, welding, bonding and equivalent means).

The platform 110 includes a substantially planar outer face 114 with an exterior side 114*a* that protects the platform and an opposite interior side 114*b*. The platform 110 also includes a substantially planar inner face 116 with an exterior side 116*a* and an opposite interior side 116*b*. During the picking process performed by the system 100, the exterior side 116*a* of the inner face 116 remains next to a target tire picked by the gripper 108. Each outer face 114 and inner face 116, having a predetermined width, has a predetermined length extending between the attachment end 110*a* and the free end 110*b* of the platform 110. The two faces are separated by a predetermined distance between the interior side 114*b* of the outer face 114 and the interior side 116*b* of the inner face 116 (this distance being represented by the space S in FIG. 7).

The gripper 108 also includes an internal engagement finger (or "internal finger") 118, and an external engagement finger (or "external finger") 120 housed in the platform 110. The internal finger 118 includes a pivotable and retractable member of predetermined length that extends between an actuation end 118*a* (at which the alternating movement of the internal finger is produced) and an opposite engagement end 118*b* (at which the internal finger engages the target tire held by the gripper during the picking process). Similarly, the external finger 120 includes a pivotable and retractable member of predetermined length that extends between an actuation end 120*a* (at which the alternating movement of the external finger is produced) and an opposite engagement end 120*b* (at which the external finger engages the target tire held by the gripper during the picking process). In an embodiment of the internal finger 118 and the external finger 120, a barbed hook (or other equivalent engagement means) may be formed at the respective engagement end 118*b*, 120*b* of one or both fingers in order to engage the target tire during the picking process of the invention.

During a picking process of the invention performed by the system 100, the internal finger 118 and the external finger 120 move alternately back and forth along the interior side 116*b* of the inner face 116 of the platform 110. In order to allow each finger to move freely, the inner face 116 incorporates a path 116*c* from the free end 110*b* of the platform 110 to a stop 122 (see FIG. 7). The path 116*c* has a predetermined length that facilitates the picking of a variety of tires and a predetermined width that allows the internal finger 118 and the external finger 122 to extend and to retract without interruption of their linear movement.

The reciprocating movement of the internal finger 118 is performed by an actuator $V_{118}$ that is actuated by pressurized fluid (for example, compressed air) from a conduit (not depicted). Accordingly, the movement of the actuator $V_{118}$ effects corresponding linear movement of the internal finger 118 between a standby position (in which the internal finger 118 is folded into a position substantially parallel with the plane of the inner face 116) (see FIG. 6) and an engagement position (in which the internal finger 118 is unfolded into an angular position with respect to the plane of the inner face 116 such that it is ready to engage the target tire) (see FIG. 9). Similarly, the reciprocating movement of the external finger 120 is performed by an actuator $V_{120}$ that is actuated by pressurized fluid (for example, compressed air) from a conduit (not depicted). As a result, the movement of the actuator $V_{120}$ effects the corresponding linear movement of the external finger 120 between a standby position (in which the external finger 120 is folded into a position substantially parallel with the plane of the inner face 116) (see FIG. 6) and an engagement position (in which the external finger 120 is unfolded into an angular position with respect to the plane of the inner face 116 such that it is ready to engage the target tire) (see FIG. 9). The actuators $V_{118}$, $V_{120}$ are selected from commercially available actuators. By virtue of the internal finger 118 and the external finger 120, the gripper 108 effects a pick that holds the target tire as the gripper moves between an engagement position (in which at least one of the internal finger 118 and the external finger 120 is in its engagement position, and in which the gripper 108 is positioned to pick the target tire without deforming the bead) (see FIG. 10) and an arrangement position (in which the gripper releases the picked tire in order to place it in a target arrangement) (see, for example, the rack 304 in FIG. 4).

The gripper 108 therefore maintains an ultra-flat configuration with retractable fingers of variable and measurable mutual separation. Thus, the system 100 allows the gripper 108 to be slipped in between the arranged tires without hampering the ability to dispose them in various arrangements.

The gripper 100 further includes an end stop 123 that serves as a stop for a target tire picked by the internal finger 118 and the external finger 120 during the picking process of the invention. At the attachment end 110a of the platform 110, the end stop 123 extends substantially perpendicular to the exterior side 116a of the inner face 116. The end stop 123 includes an exterior side 123a (which may incorporate the adapter 112), an opposite interior side 123b, and two edges 123c substantially coextensive with the predetermined width of the inner face 116. In one embodiment of the gripper 108, the interior side 123b of the end stop 123 has a curved geometry corresponding to the geometry of the target tire. In one embodiment of the gripper 108, one or more rollers 125 may be incorporated along the interior side 123b of the end stop 123 to manage the positioning of the target tire picked by the gripper (see FIG. 7).

In order to properly manage the handling of the robot 102 and the positioning of the gripper 108 that ensures secure picking of the target tire, it is necessary to visualize the arrangement of the tires and to identify the target tire for picking. In particular, identifying the center of a target tire is relevant for calculating its inner and outer diameters (the inner diameter being represented by twice the rim radius $R_j$ as discussed hereinabove in relation to FIG. 2), as well as for obtaining the representation of a target tire during picking and extraction from an unknown arrangement of tires. The representation and the center of the tire can be found by post-processing a previously generated tire segmentation. For example, a method may be used to determine whether a pixel is a candidate for the centerline. For example, active contour models can be applied along with path planning and distance transformations in order to extract the centerlines. A morphology-based level set model can be used to perform centerline extraction by learning the structural patterns of an object resembling a target tire and by estimating the object's centerline as the path.

The invention therefore takes advantage of artificial intelligence (or "AI") based methods and tools to supplement partial information provided by perception. The initial positioning of the robot 102 and the initial orientation of the gripper 108 are determined from the data obtained via the image acquisition of the system 100 and the physical environment in which the system 100 is operating (for example, as depicted in FIG. 4, with respect to the enclosure 300, the container 302 and/or the rack 304). An automatic and adaptive repositioning algorithm is used to find an ideal starting position for the robot 102 for picking a target tire in front of a storage and/or transport means (for example, a truck, a depot, a pallet and one or more equivalents) where the tires are arranged. The identification of the target tire incorporates the identification of a position where the first tire is located that is accessible for picking without human intervention (for example, in an initial or target arrangement of tires). The algorithm allows continuous improvement across all tire picking operations, ensuring that the robot 102 improves from the experience it acquires, particularly with respect to the selection of tires for extraction.

The invention leverages multi-dimensional (2-D and 3-D) sensor data for computationally effective detection. Machine learning models may use as input one or more images (or other data representations) represented by the sensor system data to generate distances of arranged tires (for example, represented as a point cloud) and/or other detections of arranged tires (for example, locations of 2-D shapes corresponding to tires).

Upon initiating the algorithm, the system 100 analyzes the physical environment and pre-positions itself at the most likely location where it believes a tire can be extracted (this function is performed during a target tire identification step of the picking process of the invention). This results in the first tire being free, avoiding not only the need for an operator to pre-position the robot 102, but also the need to scan the entire target location before commencing the picking process.

In order to reduce computational resources, the algorithm leverages the 2-D data to generate regions of interest (ROI). The ROIs can be exploited to filter out portions of the 3-D data (for example, a 3-D point cloud) that do not correspond to the ROIs.

The term "point cloud" (in the singular or the plural) is used herein to refer to one or more collections of data points in space. One or more cameras (or one or more equivalent devices) collect three-dimensional (3-D) data and detect the surfaces of the objects (for example, the arranged tires) using a series of coordinates. Storing the information as a collection of spatial coordinates can save space, because many objects do not fill a large part of the environment. Even if the information is not visual, interpreting the data as a point cloud helps with understanding the relationship among a plurality of variables through classification and segmentation. As used herein, the term "camera" includes one or more cameras.

An unsupervised artificial intelligence process is therefore used by the system 100 to segment a point cloud representing the set of arranged tires present in the field of view of a camera (for example, a camera of the detection system). The parameters of this process are also calculated automatically based on characteristics of the point cloud. That avoids an additional adjustment point in the final solution.

The locating of the predetermined location can be realized in a manner that incorporates the construction of one or more models associated with the locations corresponding to tires of various sizes. In order to create a "black box" associated with the tires, the parameters of the different tires may be used to form one or more picking models. These data accumulated in the black box can be used to make decisions regarding the picking of individual target tires by examining the parameters of the target tire, the current available picking positions, the historical picking positions, the available positions of the robot 102, the historical positions of the robot 102, and/or the time spent picking the tires that are in a particular arrangement.

The system 100 constructs a virtual tire in the form of a cylinder on the visible surface of the cluster representing a target tire using a two-step estimation process:

First of all, an estimation of the median plane of the point cloud is made. This step includes a step of injecting the result by merging data on the same point cloud to estimate the axis, the diameter and the center of the target tire.

Next, the system 100, via the decision-making algorithm, chooses the tire to be picked, this algorithm incorporating a parallelized virtual simulation between a simplified geometric model of the gripper and the set of tires in the previously reconstructed scene. The first tire that can be picked is picked, this being the "target tire".

These steps are performed simultaneously on all of the arranged tires via a parallelization performed by the employed processor. The term "processor" (or, alternatively, the term "programmable logic circuit") refers to one or more devices capable of processing and analyzing data and having one or more software packages for their processing (for example, one or more integrated circuits known by those skilled in the art as being included in a computer, one or more controllers, one or more microcontrollers, one or more microcomputers, one or more programmable logic controllers (or PLCs), one or more application-specific integrated circuits, one or more neural networks and/or one or more other known equivalent programmable circuits). The processor includes software for processing the data captured by the subsystems associated with the system 100 (and the corresponding data obtained) as well as software for identifying and locating variances and identifying their sources for correction.

A person skilled in the art will recognize that many image processing techniques can be used to select and to determine the parameters of the target tires. Several commercially available image processing systems can be used.

In an embodiment, the camera captures one or more images of the target tire. The one or more captured images are transferred and stored as captured images in the memory of the processor. The processor, which executes the instructions of an image processing module of the processor, analyzes the image in order to determine one or more parameters of the imaged tire. The parameters of the tire are generally the parameters of the tire that define the boundaries of the tire sidewalls or the region occupied by the tire sidewalls (see FIGS. 2 and 3). Sidewall detection, for example, can identify points where the brightness of the image changes sharply, such as points where there are discontinuities, and thus discriminate the location of a tire sidewall in the image relative to the image background. The processor can detect changes in the properties of the pixels to identify at least a portion of the sidewalls of the target tire. Changes in pixel color, for example, may allow the processor to differentiate between the sidewall of the tire and the background of the image (the boundary between the sidewall of the target tire and the visible outer radius of the sidewall of the target tire). In this way, the processor can identify the sidewalls of the target tire and count the number of pixels between the inner radius of the sidewall of the target tire (if known) and the outer radius of the sidewall of the target tire. By using an equation that converts pixels into length, the processor can convert the pixel measurements into measurement units (for example, centimeters, millimeters, inches or other equivalent measurements) to determine the height of the sidewall of the tire. Other parameters of the target tire may also be determined.

The sensor data from the detection system may be applied to an ROI determinant that may leverage one or more machine learning models in order to generate the target tire shapes. While embodiments are described herein with respect to the use of neural networks (and specifically convolutional neural networks (CNNs)) as a machine learning model, other types of machine learning models may be used. These include, without limitation, models employing linear regression, logistic regression, decision trees, support vector machines, naive Bayes, K-nearest neighbour (kNN), with K signifying a grouping, Random Forest, dimensionality reduction algorithms, gradient algorithms, neural networks (for example, autoencoders, CNNs, RNNs, perceptrons, logarithmic short-term memory (LSTM), Hopfield, Boltzmann, deep belief networks, deconvolution, generative adversarial networks (GANs), etc.) and their complements and equivalents. The one or more CNNs may be trained using ground truth data that are generated using sensor data representative of the movement of the robot 102, including the positioning of the gripper 108.

In some embodiments, the processor may configure the system 100 (and notably the robot 102 and the gripper 108) on one or more parameters of the target tire that are calculated by the image processing module. The processor may also refer to a reference (for example, a size table for various tires) in order to make a final determination of the one or more target tire parameters. The reference may include known tire parameters corresponding to a plurality of known commercially available tires. For example, after the image processing module calculates one or more tire parameters, the processor may compare the calculated tire parameters against the known tire parameters recorded in the reference. The processor may retrieve those known tire parameters corresponding to the commercially available tires that most closely correspond to the calculated tire parameters in order to configure the gripper 108. The tire reference may include measurements corresponding to a plurality of commercially available tires. By way of example, for a tire of size 225/50R17, the number "225" identifies the cross-sectional area of the tire in millimetres, the number "50" indicates the aspect ratio of the sidewall, and the measurement "R17" represents the rim diameter in inches (being approximately 43.18 centimetres).

The image processing module analyzes the image of the arranged tires to identify a candidate for the target tire for picking. The image processing module finds the central point C of the target tire and the rim radius $R_J$. As the central point C is already known, the image processing module can determine the distance corresponding to the tire radius $R_P$ of a target tire (for example, the radius of the target tire can be determined with the Pythagorean theorem by using vertical and horizontal distances between points in the point clouds and boundaries of the resulting image). Once the rim radius $R_J$ and the tire radius $R_P$ are known, the parameters of the target tire that are needed for configuring the gripper 108 can be determined. The image processing module can use these dimensions $R_J$, $R_P$ as indices in the tire size reference in order to determine the corresponding tire sizes and/or the tire parameters that should be used to configure the gripper 108. The resulting tire parameters may then be used to configure the gripper 108 such that the target tire grip is substantially limited to the inner boundary $F_I$ of the sidewall F.

The size of the target tire can be determined by measuring one or more chords (for example, if the chord is measured at a known height above a floor 302a of the container 302).

Once the center C is known, the maximum horizontal distance can be used to determine the rim diameter. In an embodiment, the rim radius $R_J$ can be determined using the relationship:

$$chord\ length = 2\sqrt{\{r^2 - d^2\}}$$

where r is the radius of the circle, and d is the perpendicular distance from the chord to the center of the circle. Other geometric relationships may also be used to determine the parameters of the target tire based on the particular image processing techniques employed and the amount of information contained in the image (for example, the amount of tire imaged, whether imaged in its entirety or in part). Also, mathematical representations of the objects can be used to detect anomalies, such as one or more individuals entering the physical environment. Such events may violate the ideal model, which may make them easier to detect.

With this information, the system 100 can direct the gripper 108 to the theoretical center of the target tire, corrected by the half-width of the target tire. Because the sidewall height is unknown, the adaptation of the gripper 108 to the employed algorithm allows the gripper to guess it by "feel" (namely by perception). The gripper 108 is therefore equipped with this perception that will also prove beneficial in the reverse case, during nesting. Specifically, the gripper 108 is capable of providing the external perception (conferred, for example, by the camera) with information regarding the diameter of the tire without seeing the tire "from above". This information is relevant when arranging the tires (for example, a "nested" stack) since it is by the inner diameters that the tires are nested (see, for example, U.S. Pat. No. 9,440,349). Thus, the gripper 108 can lock the target tire so that the robot 102 can extract it from its arrangement and take it to the target location during the picking process performed by the system 100.

Once the tire parameter(s) defining the boundaries of the sidewall of the target tire have been determined, the processor configures the robot 102 and, in particular, the gripper 108, based on the tire parameters in order to limit the engagement of the target tire to the boundaries of the tire sidewall.

Referring again to FIGS. 1 to 7 and also to FIGS. 8 to 12, a detailed description is given, by way of example, of a picking process (or "process") of the invention that is performed by the system 100 in the enclosure 300. It is understood that the system 100 can perform the process of the invention in any physical environment without knowledge of such an environment and without knowledge of how the tires are arranged.

Upon launching a picking process of the invention, the process includes a step of determining one or more parameters of a target tire P* in an arrangement of tires. During this step, the system 100 obtains one or more digital images of the tires $P_{302}$ arranged in the container 302 in order to identify the tire that is to become a candidate for picking (see FIG. 4). During this step, the image of the target tire P* is analyzed to identify one or more vertical front edges $B_{AV}$ of the tire in the image (see FIG. 2). During this step, the processor may continue scanning until the inner boundary $F_I$ of the sidewall F is identified. During this step, the distance between the vertical front edge $B_{AV}$ and the inner boundary $F_I$ is measured to determine a height $H_1$ of the sidewall F of the target tire. During this step, the data corresponding to the vertical front edges $B_{AV}$ can be used to identify a centerline M of the target tire. During this step, the processor may next analyze the image of the target tire and of the inner boundary $F_I$ to calculate the inner boundary $F_I$ and a vertical rear edge $B_{AR}$.

In some embodiments, the camera may capture an image of only a portion of the target tire P*, or the image of the target tire P* may be obstructed by objects in the physical environment (including, without limitation, other tires, one or more operators or one or more rails). The parameters of the target tire are determined in both instances, namely the instance in which there is no obstacle hiding the target tire and the instance in which at least part of the target tire is hidden by one or more obstacles (including one of the other tires arranged with the target tire).

The picking process further includes a step of determining the diameter of the target tire. This step includes determining a distance between the imaged vertical front edge $B_{AV}$ and the calculated vertical rear edge $B_{AR}$. This step includes determining the distance between the inner boundary $F_I$ of the sidewall F and the vertical rear edge $B_{AR}$ in order to calculate an average sidewall height $H_2$ corresponding to the size of the target tire.

In an embodiment, a virtual environment containing a 2-D and/or 3-D model of the arranged tires can be determined and used to formulate a plan or strategy for picking the tires. For example, the robot 102 can use one or more sensors to scan a physical environment containing the arranged tires and the target location(s), as shown in FIG. 4. The elongated arm 106 and/or the gripping device 104 moves, with one or more sensors on the elongated arm and/or the gripping device being able to capture data corresponding to the arranged tires so as to determine the shapes and/or the positions of the individual tires.

The picking process further includes a step of determining the tire radius $R_P$ and the rim radius $R_J$ of the target tire P*. During this step, the tire radius $R_P$ of the target tire P* can be determined as being half the diameter of the target tire. During this step, the rim radius $R_J$ of the target tire P* may be determined as being half the diameter of the inner sidewall boundary $F_I$ of the target tire. During this step, the central point C may be identified as being a distance of the rim radius $R_J$ with respect to the vertical front edge $B_{AV}$ or to the vertical rear edge $B_{AR}$ and situated along the centerline M.

Knowledge of the tire radius $R_P$ and of the rim radius $R_J$ of the target tire P* would allow the image processing module to determine the location of the inner boundary $F_I$ and the outer boundary $F_E$ of the sidewall F of the target tire. Knowledge of the average sidewall height $H_2$ and of the tire radius $R_P$ of the target tire would allow the processor to determine the size of the target tire. Thus, the relevant parameters of the target tire can be determined, for example, from the reference of tire sizes or generated from an equation.

The picking process further includes an approaching step whereby the robot 102 approaches the identified target tire P* in order to pick it. This step includes a step whereby the gripper 108 approaches the target tire P* and the internal finger 118 extends (see FIG. 8). During this step, the gripper 108 is directed so that the interior side 123b of the end stop 123 comes into proximity of the tread surface $S_P$* of the target tire. Simultaneously, the internal finger 118 pivots to extend its engagement end 118b towards an engagement point of the inner boundary $F_I$ of the sidewall F.

Figure 9:
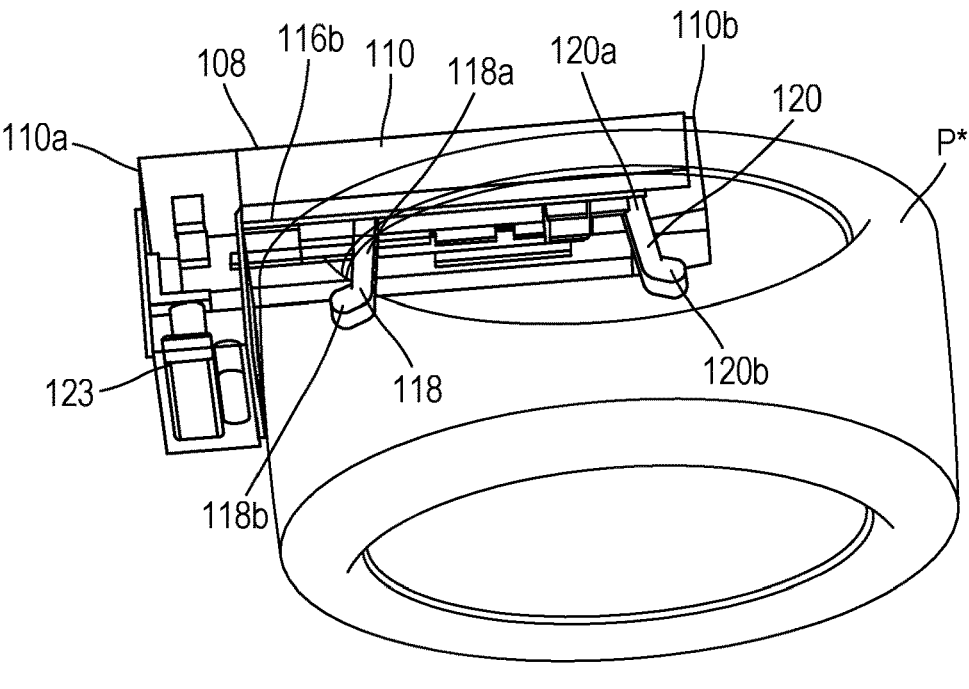
FIG. 9 depicts a schematic view from below, of the gripper of FIGS. 6 and 7 in the course of picking a target tire during a picking process of the invention.

The picking process further includes a step of picking the target tire P* (see FIG. 9). During this step, the internal finger 118 is set in motion along the interior side 116b of the inner face 116 of the platform 110 towards a first engagement point $T_1$ along the inner boundary $F_I$ of the sidewall F. This movement continues until the internal finger 118 engages the first engagement point $T_1$. In this manner, the internal finger 118, with the interior side 123b of the end stop 123, holds the sidewall F and the tread surface $S_P$* of the target tire P*.

Figure 10:
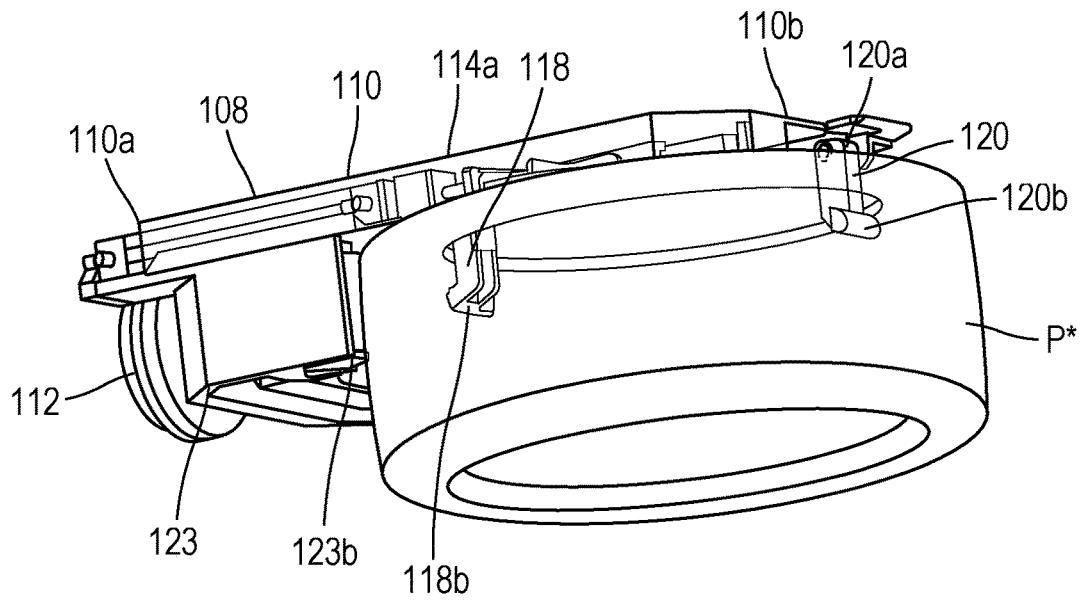
FIGS. 10, 11 and 12 represent, respectively, a view in perspective, a view from above and a view from below, of the gripper of FIGS. 6 and 7 in the course of handling a tire during a picking process of the invention.
Figures 11, 12:
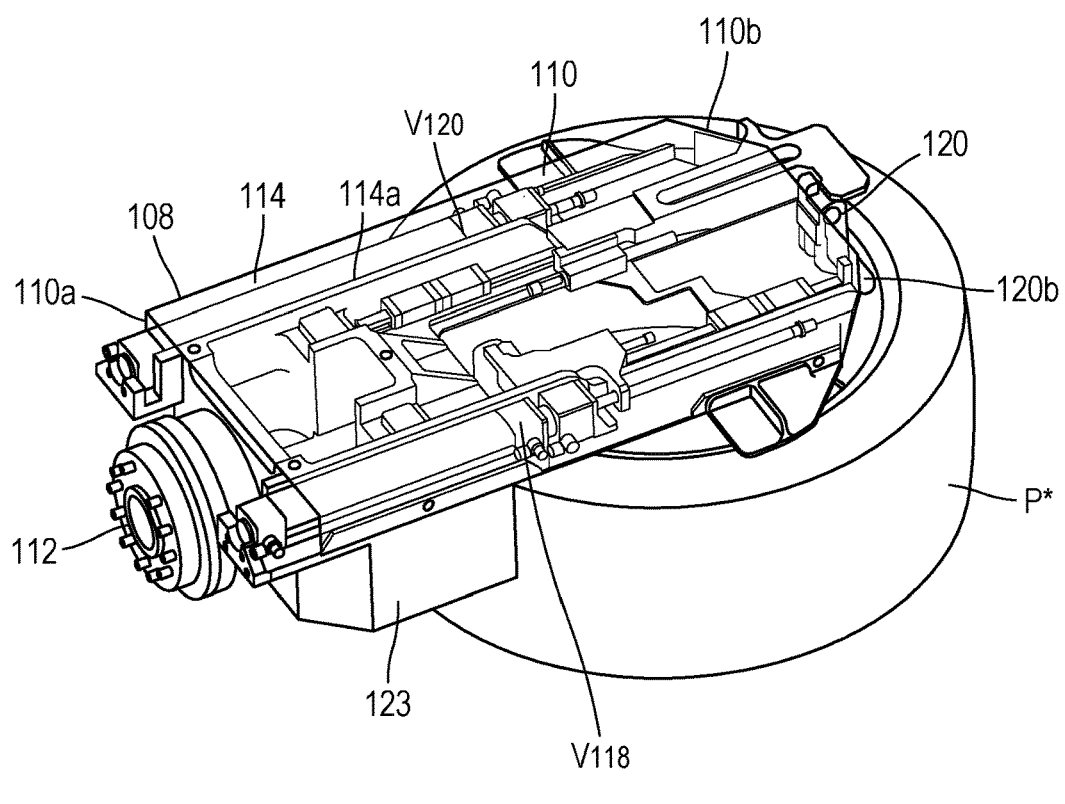

This step includes a step of moving the external finger 120 along the interior side 116b of the inner face 116 of the platform 110 towards a second engagement point $T_2$ along the inner boundary $F_I$ of the sidewall F (see FIG. 10). During this step, the external finger 120 pivots to extend its engagement end 120b towards the second engagement point $T_2$ so that the internal finger 118 and the external finger 120 are extended along the rim diameter of the target tire P*.

The picking process of the invention includes a final step of extracting the target tire P* from the arrangement in order to place it in a predetermined location (for example, on a top shelf 304a of the rack 304). This step includes a step of transporting the target tire P* towards the predetermined location, which step is performed by the robot 102. During transport, the external finger 120 maintains the target tire P* in proper alignment with the interior side 116b of the inner face 116 of the platform 110 (see FIGS. 11 and 12).

The system 100 can easily repeat the preceding steps in an order to properly arrange the tires in the target arrangement.

Because the target tire is gripped along its internal diameter, the algorithm, since it merely has to realign a cylinder on a surface, maintains a good level of performance. It is such that the robot 102 can operate with incomplete information, thus shortening response times and increasing the work rate of the system 100. The picking principle adopted is to grip the target tire at its center, pressing against the bead wires so that the tire can be manipulated efficiently. In the prior art, robots are unable to see the center of the target tire for gripping and are merely able to see a portion of its outer surface. The system 100, on the basis of parcellated information, is therefore able to "imagine" the physical environment before and after the picking the target tires.

The system 100 of the invention may include pre-programmed gestion information. For example, a process setting may be associated with the parameters of the typical physical environments in which the system operates. In some embodiments of the invention, the system 100 (and/or an installation incorporating the system 100) may receive voice commands or other audio data representing, for example, the starting or stopping of the capture of images of the tires, the starting or stopping of movement of the robot 102 or manipulation of the gripper 108. The request may include a request for the current status of a cycle of an automatic recognition process. A response generated can be represented audibly, visually, in a tactile manner (for example, by way of a haptic interface) and/or in a virtual and/or augmented manner. This response, together with the corresponding data, can be recorded in a neural network.

For all embodiments of the system 100, a monitoring system could be implemented. At least one part of the monitoring system may be supplied in a portable device such as a mobile network device (for example, a mobile telephone, a laptop computer, one or more portable devices connected to the network (including "augmented reality" and/or "virtual reality" devices, wearable clothing connected to the network and/or any combinations and/or any equivalents)). It is conceivable that detection and comparison steps may be performed iteratively.

The terms "at least one" and "one or more" are used interchangeably. The ranges given as lying "between a and b" encompass the values "a" and "b".

Although particular embodiments of the disclosed apparatus have been illustrated and described, it will be understood that various changes, additions and modifications can be made without departing from the spirit or the scope of the present description. Therefore, no limitation should be imposed on the scope of the invention described, apart from those set out in the appended claims.

The invention claimed is:

1. A tire picking system that performs a process for picking one or more tires stored in an unknown arrangement and for which a target location must be realized, the system comprising:

a robot with a gripping device supported by a pivotable elongated arm, the gripping device extending from the elongated arm to a free end;

a gripper arranged along a longitudinal axis at the free end of the gripping device;

a detection system having one or more sensors that capture one or more images of a physical environment around the robot incorporating the stored tires and that collect representative data in a field of view of the sensors; and a processor comprising an image processing module that applies the representative data to a deployed neural network and that analyzes the captured images in order to determine, using the deployed neural network, one or more parameters of a target tire imaged in the field of view of the sensors, such that the robot is set in motion based on the determined parameters of the target tire, so that the gripper can pick the target tire selected by the system from among the stored tires along an inner boundary of a sidewall of the selected target tire, wherein the gripper comprises:

a platform with a predetermined length between an attachment end, at which the platform is removably attached to the robot, and an opposite free end, the platform comprising:

a substantially planar outer face with an exterior side that protects the platform and an opposite interior side; and a substantially planar inner face with an exterior side and an opposite interior side, the internal face incorporating a path from the free end as far as a stop of the platform, with each of the substantially planar outer face and the substantially planar inner face having a predetermined width and a predetermined length that extends between the attachment end and the free end of the platform, and the two faces being separated by a predetermined distance between the interior side of the substantially planar outer face and the interior side of the substantially planar inner face; and an internal finger and an external finger housed in the platform, each of the internal finger and the external finger comprising a pivotable and retractable member of predetermined length that extends between an actuation end and an opposite engagement end, with each finger being movable along the path of the inner face of the platform between a standby position, in which each finger is folded into a position substantially parallel to the plane of the substantially planar inner face, and an engagement position, in which each finger is unfolded into an angular position with respect to the plane of the substantially planar inner face so that it is ready to engage the target tire along the inner boundary of the sidewall of the selected target tire.

2. The system of claim 1, wherein the parameters of the imaged target tire comprise at least one of the following parameters:

the inner boundary and an outer boundary of the sidewall that together define the boundaries of the sidewall of the target tire;

a rim radius defined as being a distance between a central point of the tire and the inner boundary of the sidewall;

a sidewall internal diameter defined as being twice the rim radius;

a tire radius defined as being a distance between the central point and the outer boundary of the sidewall; or a tire diameter defined as being twice the tire radius.

3. The system of claim 2, wherein the gripper is configured such that the engagement end of the internal finger grips a first engagement point along the inner boundary of the sidewall of the target tire, and the engagement end of the external finger grips a second engagement point along the inner boundary of the sidewall of the target tire so that the gripper engages the target tire along the inner sidewall diameter of the target tire.

4. The system of claim 1, further comprising a control system that directs movement of the robot based on the data representative of the physical environment obtained by the detection system.

5. A gripper forming part of a tire picking system that performs a process for picking one or more tires stored in an unknown arrangement and for which a target location must be realized, the gripper comprising:

a platform with a predetermined length between an attachment end, at which the platform is detachably attached to a robot, and an opposite free end, the platform comprising:

a substantially planar outer face with an exterior side that protects the platform and an opposite interior side; and a substantially planar inner face with an exterior side and an opposite interior side, the inner face incorporating a path from the free end to a stop of the platform, with each substantially planar outer face and each substantially planar inner face having a predetermined width and a predetermined length that extends between the attachment end and the free end of the platform, and the two faces being separated by a predetermined distance between the interior side of the substantially planar outer face and the interior side of the substantially planar inner face; and an internal finger and an external finger housed in the platform, each of the internal finger and the external finger comprising a pivotable and retractable member of predetermined length that extends between an actuation end and an opposite engagement end, with each finger being movable along the path of the substantially planar inner face of the platform between a standby position, in which each finger is folded into a position substantially parallel to the plane of the substantially planar inner face, and an engagement position, in which each finger is unfolded into an angular position with respect to the plane of the substantially planar inner face so that it is ready to engage a target tire selected from the stored tires along an inner boundary of a sidewall of the selected target tire corresponding to an inner sidewall diameter of the target tire.

6. The gripper of claim 5, wherein the gripper is configured such that the engagement end of the internal finger engages a first engagement point along the inner boundary of the sidewall of the target tire, and the engagement end of the external finger engages a second engagement point along the inner boundary of the sidewall of the target tire so that the gripper engages the target tire along the inner sidewall diameter of the target tire.

7. The gripper of claim 5, wherein a processor of the system comprising a module for processing images of a physical environment around the gripper applies representative data of the physical environment to a deployed neural network and analyzes the captured images to determine, using the deployed neural network, one or more parameters pertaining to the target tire so that the gripper can pick the target tire on the basis of the determined parameters.

8. The gripper of claim 7, wherein the determined parameters comprise at least one of the following parameters:

the inner boundary and an outer boundary of the sidewall that together define the boundaries of the sidewall of the target tire;

a rim radius defined as being a distance between a central point of the tire and the inner boundary of the sidewall;

an inner sidewall diameter defined as being twice the rim radius-;

a tire radius defined as being a distance between the central point and the outer boundary of the sidewall; or a tire diameter defined as being twice the tire radius.

9. A robot comprising a gripping device supported by a pivotable elongated arm, the gripping device extending from the elongated arm to a free end where the gripper of claim 5 is disposed.

* * * * *